UNITED STATES PATENT OFFICE.

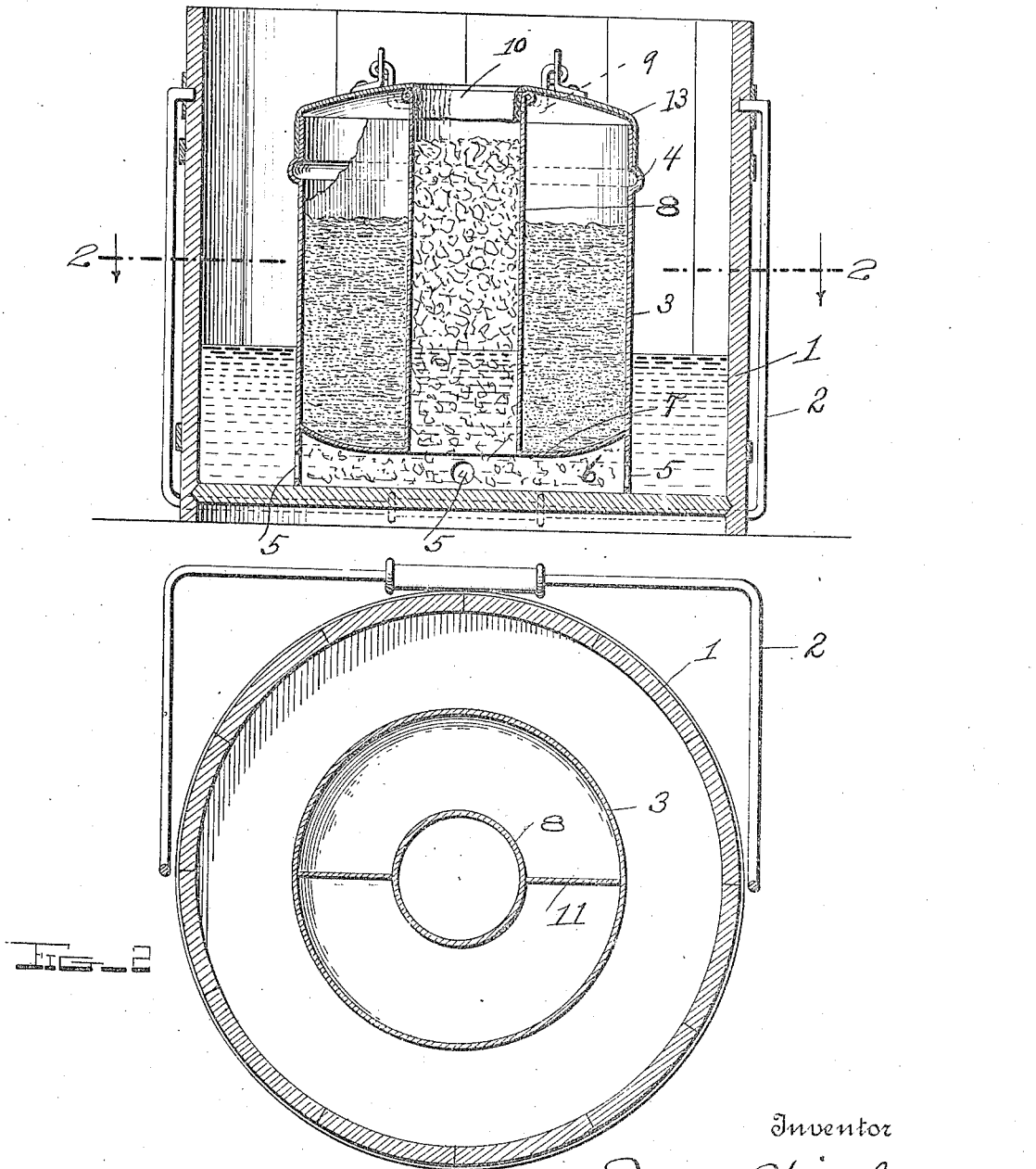

JEROME HIRSCH, OF NEW ORLEANS, LOUISIANA.

ICE-CREAM FREEZER.

1,268,713.

Specification of Letters Patent.

Patented June 4, 1918.

Application filed July 23, 1917. Serial No. 182,293.

*To all whom it may concern:*

Be it known that I, JEROME HIRSCH, a citizen of the United States, residing at New Orleans, in the parish of Orleans and State of Louisiana, have invented new and useful Improvements in Ice-Cream Freezers, of which the following is a specification.

My present invention pertains to ice-cream freezers, and consists in the simple, compact and efficient freezer as hereinafter described and definitely claimed.

In the accompanying drawings which are hereby made a part hereof:

Figure 1 is a vertical, diametrical section of my novel freezer.

Fig. 2 is a horizontal section taken in the plane indicated by the line 2—2 of Fig. 1, looking downwardly.

Similar numerals of reference designate corresponding parts in both views of the drawings.

The outer receptacle of my novel apparatus is preferably, though not necessarily, in the form of a wooden pail 1, of about the diameter and depth illustrated, equipped with a bail-shaped handle 2.

In the said receptacle and on the bottom thereof, is loosely arranged the body 3 of the freezer which is of sheet-metal or other material compatible with its purpose. The said body 3 is exteriorly ribbed at 4 and is provided with a depending portion adapted to support it on the bottom of the receptacle and provided with apertures 5 for the passage of water from the space inclosed by said portion to the interior of the receptacle 1. The said body 3 is provided with a central vertical tube 8 that is open at its lower and upper ends, and the body is also provided with a cream chamber that surrounds the tube 8 and is open at its upper end but is closed at its lower end by a wall 7.

The cream chamber referred to is divided vertically by stationary partitions 11 clearly shown in Fig. 2, the purpose of which is to permit of the freezing of two kinds of cream, or cream on one side and sherbet on the other, at one and the same time. But when it is desired to freeze only one kind of cream or sherbet then both sides of partition 11 may be partially or fully filled with the same.

Slipped on the body 3 is a removable cover 13 which is designed to bring up against the rib 4 and is provided with a central depending tube 10 of about one inch in length which fits snugly into the upper end of the tube 8. On the said cover 13 is a handle 9 which is hinged to lugs on the cover so as to normally rest in the depending position shown partly in full lines and partly in dotted lines in Fig. 1.

In the practical use of my improvement, the cream chamber around the tube 8 is filled to the extent desired with the cream to be frozen. The cover 13 is then placed on the body 3, and the tube 8 is filled through the smaller tube 10 in the cover with ice and salt. The space between the body 3 and the wooden pail 1 is likewise filled with salt and ice as is customary in ordinary freezers, and the contents of the body 3 will be automatically frozen without any turning or motion of the same. Incidental to the filling of the tube 8, it will be manifest that a portion of the ice supplied to the tube will pass into and occupy the space 6 within the foraminous depending portion of the outer wall of the body 3 with the result that the ice in the body will act against the bottom wall of the cream chamber as well as against the inner wall thereof.

During the use of my improved freezer, it will be manifest that the water drawn from the ice by the salt will be able to freely pass away from the ice through the apertures 5, and in consequence the water will be effectually prevented from interfering with the freezing of the cream.

Having described my invention, what I claim and desire to secure by Letters-Patent, is:

An ice cream freezer, comprising a body having a central vertical tube, and a chamber surrounding the tube; the chamber being closed at its lower end and open at its upper end, and the tube being open at its upper and lower ends, and the bottom of the chamber and the lower end of the tube being arranged above the support on which the body is arranged to permit the passage of water below the chamber, and a removable cover common to the chamber and the tube; the said cover having a flange for tightly closing the chamber and also having a central vertical tube that tightly fits in the tube of the body and is open at its lower and upper ends.

In testimony whereof I have hereunto set my hand in presence of two subscribing witnesses.

JEROME HIRSCH.

Witnesses:
P. J. McManus,
H. R. Hafkesbring.